United States Patent
Burgler (10) Patent No.: US 7,721,432 B2
(45) Date of Patent: May 25, 2010

(54) ARRANGEMENT AND METHOD FOR PRODUCING A CAMSHAFT

(76) Inventor: Robert Burgler, Spidach 238, Ruggell (LI) LI-9491

( * ) Notice: Subject to any disclaimer, the term of this patent is extended or adjusted under 35 U.S.C. 154(b) by 888 days.

(21) Appl. No.: 10/597,013

(22) PCT Filed: Dec. 4, 2004

(86) PCT No.: PCT/EP2004/013816

§ 371 (c)(1),
(2), (4) Date: Jul. 6, 2006

(87) PCT Pub. No.: WO2005/066522

PCT Pub. Date: Jul. 21, 2005

(65) Prior Publication Data

US 2007/0180694 A1    Aug. 9, 2007

(30) Foreign Application Priority Data

Jan. 12, 2004    (EP) .................................. 04000410

(51) Int. Cl.
*B21K 1/12*    (2006.01)
*F16D 1/072*   (2006.01)
*B65G 43/00*   (2006.01)

(52) U.S. Cl. .................... 29/888.1; 403/282; 198/346.3

(58) Field of Classification Search ............... 29/425, 29/430, 444, 525, 564, 564.1, 33 K, 650, 29/700, 505, 508, 526, 527, 521, 888.1; 403/282; 198/346.2, 346.3, 341.05; 269/43, 37; 81/57.5, 81/57.33

See application file for complete search history.

(56) References Cited

U.S. PATENT DOCUMENTS

| 4,265,388 A | 5/1981 | Takahashi et al. |
| 4,903,543 A | 2/1990 | Matt et al. |
| 5,307,708 A | 5/1994 | Matt et al. |
| 5,419,217 A | 5/1995 | Umezawa et al. |
| 6,416,245 B1 | 7/2002 | Matt |
| 2002/0096014 A1 | 7/2002 | Leuthold |

FOREIGN PATENT DOCUMENTS

| EP | 0462081 A | 12/1991 |
| GB | 2156937 A | 10/1985 |
| JP | 02150541 A | 6/1990 |
| JP | 08294832 A | * 11/1996 |

* cited by examiner

*Primary Examiner*—Sam Chuan C Yao
*Assistant Examiner*—Jacob J Cigna
(74) *Attorney, Agent, or Firm*—David A. Guerra

(57) ABSTRACT

An arrangement and method for producing a camshaft comprised of a shaft (2) and of a number of cams (3, 3', 3") pressed thereon comprises at least two machining stations (11) of which at least one is provided in the form of knurling station (4) and at least one is provided in the form of a press-on station (5). A shaft (2) is firstly fixed in a brandishing station (4) with the aid of a positioning element (7) fastened to the shaft, and the shaft is subsequently brandished. Afterwards, a cam (3) is pressed onto the shaft (2) in a press-on station (5). To this end, the press-on station (5) comprises a workpiece holder, which corresponds to the positioning element and which serves to provide a holding, particularly to provide an angle-precise holding, of the shaft (2) with the positioning element (7) fastened thereto.

21 Claims, 9 Drawing Sheets

ARRANGEMENT AND METHOD FOR PRODUCING A CAMSHAFT

CROSS-REFERENCE TO RELATED APPLICATIONS

This application is an U.S. national phase application under 35 U.S.C. §371 based upon International Application No. PCT/EP2004/013816 filed Dec. 4, 2004. Additionally, this U.S. national phase application claims the benefit of priority of co-pending International Application No. PCT/EP2004/013816 filed Dec. 4, 2004, and European Application No. EP 04000410.3 filed Jan. 12, 2004. The entire disclosures of the prior applications are incorporated herein by reference. The international application was published on Jul. 21, 2005 under Publication No. WO 2005/066522 A1.

STATEMENT REGARDING FEDERALLY SPONSEORED RESEARCH OR DEVELOPMENT

Not Applicable

THE NAMES OF THE PARTIES TO A JOINT RESEARCH AGREEMENT

Not Applicable

INCORPORAITO-BY-REFERENCE OF MATERIAL SUBMITTED ON A COMPACT DISC

Not Applicable

BACKGROUND OF THE IVENTION

1. Field of the Invention

The invention relates to an arrangement and a method for producing a camshaft comprising a shaft and a number of cams pressed thereon having the features of the preamble of the independent claims.

2. Description of Related Art

Numerous method for producing camshafts by pressing cams onto a shaft are already known. For example, WO A1 01/94802 describes a method in which the shaft is treated by plastic deformation at the positions provided for the cams, whereby accumulations of material are formed, a cam is pressed onto this position whereby this material is deformed by the cam and the cam is fixed on the shaft.

EP 462 081 B1 describes an automatic machine for force-fitting cams onto a camshaft. The cams are guided via a feed channel to an assembly seat located on the work table of the automatic machine. The shaft is then inserted into the hole of the cam and lowered. If the cams are to be arranged in different angular orientations on the shaft, the shaft is turned about its own axis in the automatic machine in a computer-controlled manner. The shaft is not rolled between the pressing steps according to this document.

DE 28 38 995 A discloses a device for assembling a camshaft which contains a rotary table and a cylinder bearing the camshaft which moves the shaft through the cams located on the rotary table. The cams are fixed on the rotary table in dies. The number of dies corresponds to the number of cams for the camshaft. The dies are brought into the desired position before assembling the camshaft.

In practice, however, it has been found that the known construction is complex and handling is difficult. The costs for purchasing possibly one previously described indexing rotary table are very high. Also changes in the number of cams for the camshaft to be constructed or changes in the angular position of the cams make the handling of the indexing rotary table difficult.

BRIEF SUMMARY OF THE INVENTION

It is thus the object of the present invention to avoid the disadvantages of the known methods, especially to provide an arrangement and a method of the type described initially which is distinguished by simple handling and low investment costs. The arrangement should further have a high availability and should also thus ensure a high mounting accuracy of the cams for the camshaft. The method should further be simplified in such a manner that no specialist staff are required in the event of faults and changeover times can be kept short.

According to the invention, these objects are achieved with an arrangement and a method for producing a camshaft having the features of the characterising part of the independent claims.

The arrangement for producing a camshaft from a shaft and a number of cams pressed thereon comprises at least two machining stations, wherein at least one is embodied as a knurling station and at least one is embodied as a press-on station. As a result of this arrangement, it is achieved that expensive special machines are superfluous and largely standard or series-produced machines must be acquired as machining stations. The machining line for producing a camshaft accordingly consists substantially of knurling stations and press-on stations, whereby the purchasing costs can be reduced considerably and the requirements for the operator can be kept low. As a result of the low investment, it is also possible to keep reserve units.

A shaft onto which cams are pressed has a positioning element affixed thereto. The knurling and press-on stations have workpiece-receiving sockets corresponding to the positioning element which are used to position the shaft on the machining stations. Thus, the shafts can be inserted into the respective machining stations especially with angular precision. Through the assistance of the positioning element, the shaft is easy to handle for positioning and a high accuracy of the cams pressed onto the shaft is ensured. The workpiece-receiving sockets of the various machining stations are generally embodied as the same.

The arrangement for producing a camshaft comprises a plurality of knurling stations and respectively following press-on stations as well as a manipulating device for conveying the shaft respectively from one machining station to the next. A rapid run of the shaft as far as its assembly to form a camshaft is ensured with the aid of the manipulating device. Consequently, the various necessary working steps can also be carried out in a clocked fashion. Thanks to this arrangement, the machining processes can be arranged flexibly and adapted rapidly to the number of work processes since the number of machining stations can be adapted to the respective requirements. There is no restriction on successive machining stations.

In one exemplary embodiment, the positioning element is embodied as a mandrel or a chuck. These machine elements allow the positioning means to be fixed simply and quickly to the shaft. The shaft is firmly connected to the mandrel or the chuck over the entire machining process. The handling of this shaft is substantially simplified for the machining and for the conveyance from one transport station to the next. For the respective machining (knurling or pressing-on) the mandrel is inserted into the corresponding workpiece-receiving socket of the machining station and clamped. Preferably, a taper key can be inserted between the mandrel and the workpiece-receiving socket which predefines the defined position, especially the angular position; this can also be used in a knurling station so that the positively and/or non-positively inserted taper key receives the torque for the rotation of the shaft about its shaft axis for the knurling.

According to a further aspect of the invention, the positioning element which is affixed to the shaft is constructed as complementary to the shaft. Thus, the receiving socket for the shaft of the mandrel or the chuck approximately corresponds to the shaft diameter so that the positioning element can be inverted over a shaft termination as a tight fit. Since the position reference is pre-determined via the positioning element, an optimal connection of shaft and positioning element is of decisive importance. The positioning element is attached in the area of the shaft termination or end before the first machining step or before the first machining station. A camshaft can likewise have a position reference, for example, a groove or bore. This position reference is used to install the camshaft in the correct angular position in an internal combustion engine whereby, in particular the position of the crankshaft and the camshaft are matched to one another.

In a further exemplary embodiment, the workpiece-receiving sockets are configured as the same for all machining stations. This substantially simplifies the procedural sequence for producing a camshaft. Another advantage is that the costs for producing a camshaft can be lowered.

It is especially advantageous if the interface between the positioning element and the corresponding workpiece-receiving socket is configured such that a positive and/or non-positive connection is provided. As a result, the shaft is fixedly clamped to the machining station by means of the positioning element. Especially advantageously, for example, the positioning element is configured as conical so that this can be inserted simply into the corresponding workpiece-receiving socket of the machining station. In addition, a taper key can be pressed between the positioning element and workpiece-receiving socket, the position of the positioning element appropriately representing the position.

A camshaft comprising a shaft and a number of cams is pressed onto the shaft in a series of machining steps. The production process comprises the following steps: the positioning element is affixed to the shaft, a first machining step then comprises fixing the shaft on to a first machining station using the positioning element and subsequent machining, in a second machining step the shaft is affixed to a second machining station using the positioning element and machined, the position of the shaft with respect to the machining station being predefined by the positioning element.

In the first machining step the shaft is knurled. As a result of the knurling, the shaft is plastically deformed in the area of the seat of the cam to be applied subsequently, whereby the shaft diameter is enlarged. For this purpose the shaft is usually rotatably affixed about an axis A by means of the positioning element and is driven by means of the machining station. The rollers of the knurling station are preferably mounted so that they can rotate freely and are pressed in the correct position towards the shaft in the direction of the shaft axis.

In the second machining step the cam is pressed onto the position knurled in the first working step. For this purpose the cam is guided onto the shaft via the cam opening and is moved in the longitudinal direction as far as the correct height.

The shaft with the positioning element affixed thereon runs through at least one knurling station and at least one press-on station in the method for producing a camshaft. The method of production substantially comprises modules which each comprise one knurling station and one press-on station. This modular structure ensures optimal matching of the method to the respective requirements. Consequently, the machining line for producing a camshaft comprises at least one knurling station and at least one press-on station.

In one exemplary embodiment, in a first machining step the shaft is knurled on a knurling station in the area of the positions provided for the cams and then in a second step a cam is pressed on a press-on station (5) in the provided position and these two steps are repeated. This cycle is repeated many times until the last cam has been pressed-on. The positions for the knurling differ in respect of their height in the longitudinal direction of the shaft; the correct height and the correct angular position should be maintained for pressing on the cams. The cams are therefore pressed-on as far as the desired height in the longitudinal direction. The position of the shaft pre-defined using the positioning element determines the angular position of the cams.

It is advantageous if the defined position for fixing the shaft with the aid of the positioning element on a press-on station or on a knurling station is the same for at least all the knurling stations and that the cams are brought into the correct angular position for pressing-on. Since the position for fixing the shaft is the same in all press-on stations, the method for producing a camshaft can be configured more efficiently. It is especially advantageous if the defined position for fixing the shaft is the same for all the press-on stations and for all the knurling stations since during conveyance of a shaft from one machining station to the next, only translatory movements are required and a rotation of the shaft about its axis is omitted. The correct angular position of the cams is ensured, for example, by a correspondingly adjusted mounting seat for pressing-on the cams.

Alternatively, the defined position for fixing the shaft onto the press-on stations using the positioning element can in each case predefine the angular position for pressing on the cam. For this purpose, the workpiece-receiving socket of the press-on stations corresponding to the positioning element, for example, can be brought into the correct angular position. The cams or the corresponding mounting seat for pressing-on the cams are embodied as the same in all press-on stations.

It can be especially advantageous if the knurling or pressing-on is carried out in respectively the same knurling station or in respectively the same press-on station. The producer of a camshaft can thus manage with only two machining stations whereby the required investment costs can be kept low. This process arrangement is particularly advantageous when producing camshafts in small numbers.

In an alternative exemplary embodiment, the production process is carried out in a plurality of knurling stations or press-on stations. One knurling station and one press-on station form a module for this. It is best in terms of machining technology if the number of modules corresponds to the number of cams to be applied. For the production of a camshaft comprising eight cams to be pressed on, for example, it is therefore advantageous to use eight knurling stations and eight press-on stations with a large number of items. This arrangement has the advantage that the knurling station and the press-on station need not be refitted or re-adjusted before receiving a shaft to be machined. However, for said camshaft with eight cams, for example, it can also be advantageous if the machining line respectively only comprises four machining stations (knurling station and press-on station). The shaft then runs through the machining line twice. This arrangement is therefore very flexible.

After the last machining step, the positioning element can be removed from the shaft.

The advantage of using the positioning element is that with the aid of the positioning element, the shaft has a precise and easy-to-handle position reference whereby the shaft can be brought into a pre-adjusted machining station in the exact position. This has the advantage that additional and complex equipment for positioning the shaft can be dispensed with. For example, a shaft need not be rotated about its axis for pressing-on the shaft during a machining step in a machining station. A complex control system is superfluous.

BRIEF DESCRIPTION OF THE SEVERAL VIEWS OF THE DRAWINGS

Further individual features and advantages of the invention are obtained from the following description of the exemplary embodiments and from the drawings. In the figures:

FIG. 2a-2e is an enlarged side view of the shaft or the camshaft, FIG. 2d is a shaft and cams before pressing-on, FIG. 2e is a camshaft after pressing-on, FIG. 3a is an enlarged representation of the view of a cam cross-section and the shaft with accumulations of material as well as parts of the press-on device before pressing-on, FIG. 3b is the cam cross-section with shaft after pressing-on, FIG. 4 is a perspective view of a finished camshaft with an additional position reference.

DETAILED DESCRIPTION OF THE INVENTION

The figures show exemplary embodiments with the features of the invention in a schematic representation; they do not present any exact size relationships (or dimensional details) and merely serve to illustrate the basic principle.

Figure 1:
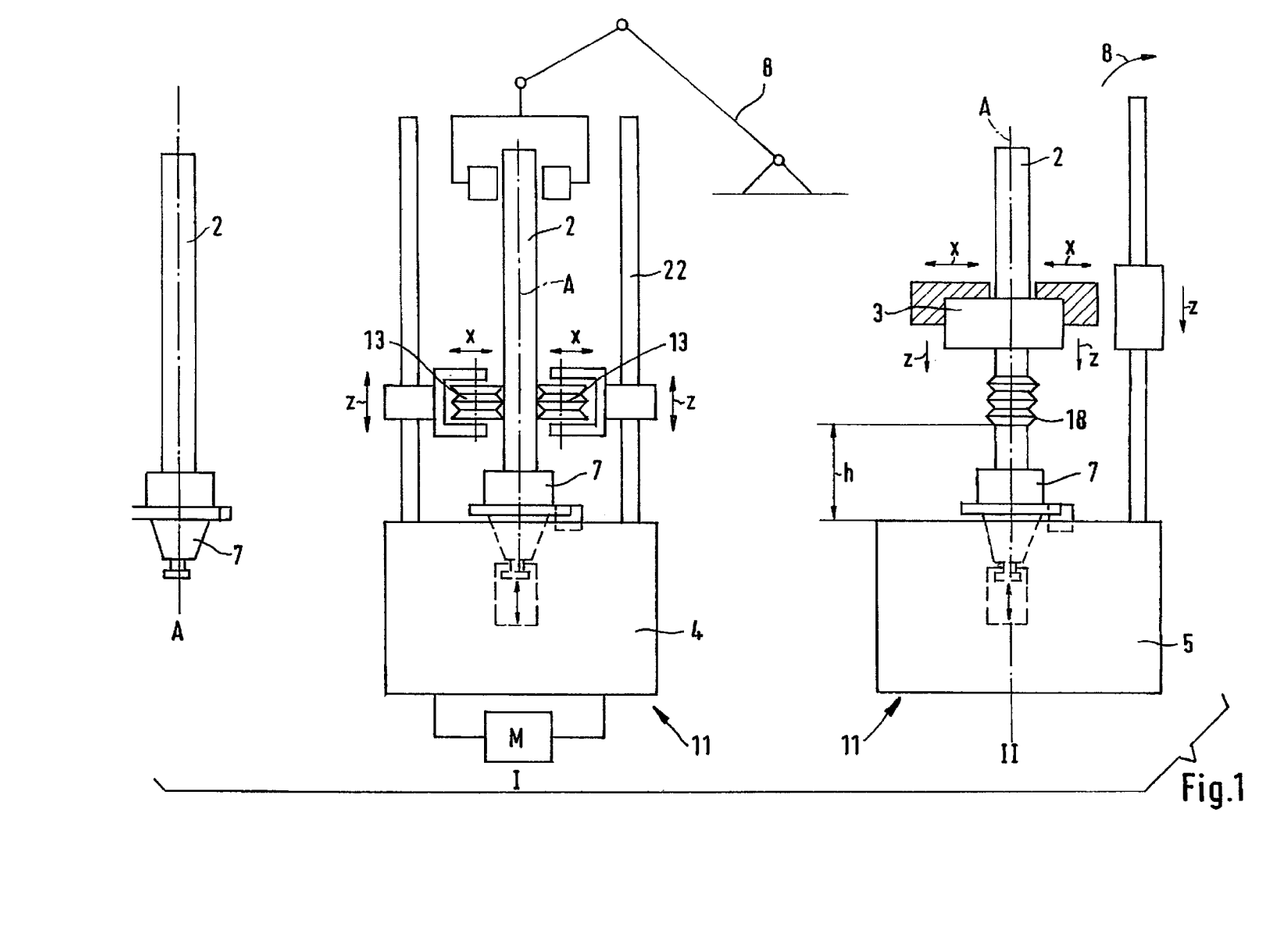
FIG. 1 is a schematic side view of an arrangement according to the invention for producing a camshaft.

As shown in FIG. 1, a machining line for producing a camshaft 1 comprising a shaft 2 and a number of cams 3 pressed thereon substantially comprises two machining stations 11. The shaft 2 with a positioning element 7 affixed thereon is transported by means of a manipulating device 8 to the first machining station 11, a knurling station 4. The shaft 2 is fixedly clamped in the knurling station by means of the positioning element 7 and is fixed there so that it can rotate about an axis A. A motor M, preferably a controlled electric motor, ensures that the shaft 2 rotates. The knurling station 4 comprises rollers 13 which can be displaced in the x-direction and in the z-direction. During the rolling process the shaft 2 and the positioning element 7 affixed thereon is rotated about the axis A and the rollers 13 which can be moved by means of a guide 22 into the correct height position h for the cams to be pressed-on, are pressed towards the A axis in the x-direction. The knurling process lasts until the desired accumulations of material have been achieved.

After the end of the knurling machining process, the shaft 2 with the positioning element 7 is transported by a manipulating device 8 to the next machining station 11. The second machining station 11 is a press-on station 5. The shaft 2 is brought into the press-on station 5 with the aid of the positioning element 7 and is fixed in a pre-defined position. The positioning is explained in further detail in connection with FIGS. 4 to 6. The cam 3 is then pressed in the z direction onto the shaft as far as the correct position.

The press-on process is followed by a further knurling and pressing-on for the next cam 3. This is repeated until the last cam 3 has been pressed onto the shaft 2.

Figure 2A:
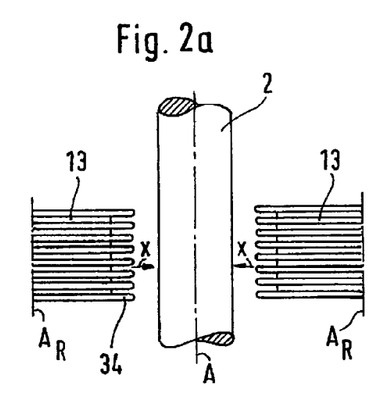
FIG. 2a is a shaft before knurling.
Figure 2B:
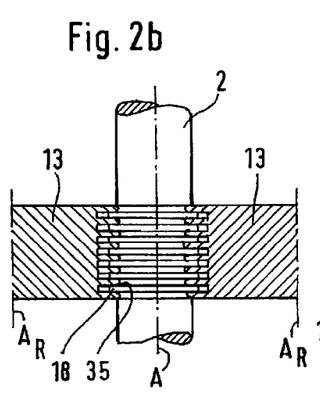
FIG. 2b is a shaft during knurling.
Figure 2C:
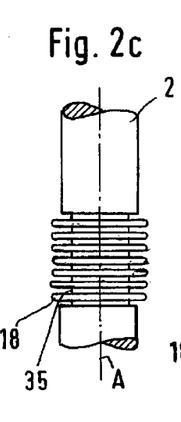
FIG. 2c is a shaft after knurling.

FIGS. 2a to 2e show the knurling of the shaft 3. FIG. 2a shows the shaft 2 which has not yet been machined in the area of the cam to be applied subsequently. The shaft 2 consists of a metallic material, preferably steel. In most cases, the shaft is tubular for reasons of weight. Naturally, the shafts 2 can also have a solid cross-section. The rollers 13 have a plurality of adjacent grooves in the form of knife- or cutter-like elevations 34. The rollers consist of a wear-resistant material which is harder than the shaft material to be treated. The material is preferably hardened at least in the area of the knife-like elevations 34. In FIG. 2b the rollers 13 are pressed so far in the x direction towards the shaft axis A that indentations 35 and material accumulations 18 are formed over the circumference of the shaft 2 as a result of the knife-like elevations 34 of the rollers 13. In the present embodiment the rollers 13 are fixed freely rotatably so that they can rotate freely about an axis $A_R$. The rotation required for the knurling process is effected by the shaft 2 which is affixed rotatably about the axis A.

Figure 2D:
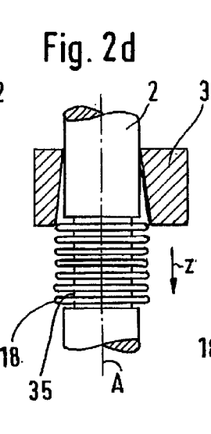
Figure 2E:
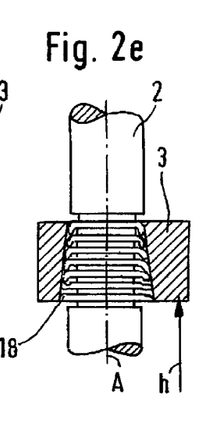

FIGS. 2d and 2e show the pressing-on process. In FIG. 2d the cam 3 has already been pushed onto the shaft 2. No deformation or forming of material has yet taken place. The arrow z indicates the press-on direction. FIG. 2e shows the shaft 2 and the cam 3 after pressing on. The material accumulations 18 have been formed in the pressing-on direction z whereby the cam 3 is joined firmly and non-detachably to the shaft 2.

Figure 3A:
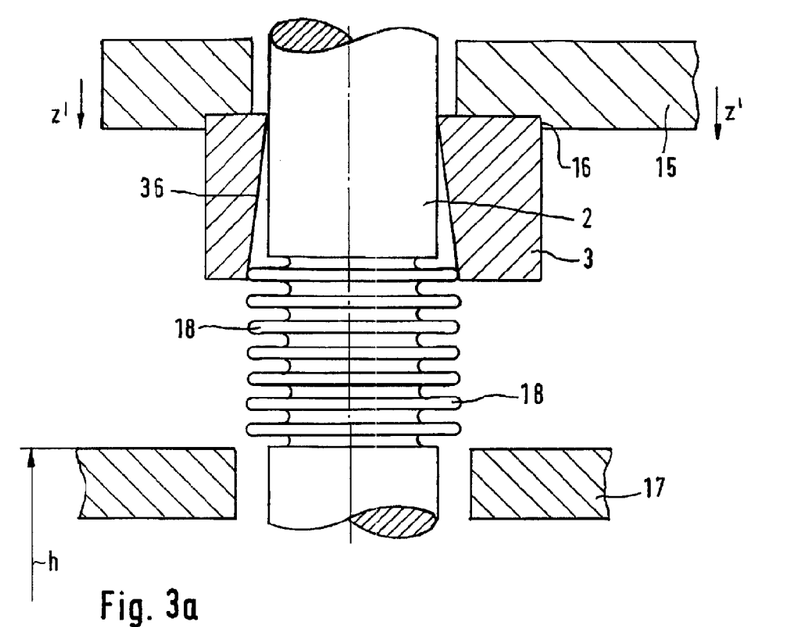
Figure 3B:
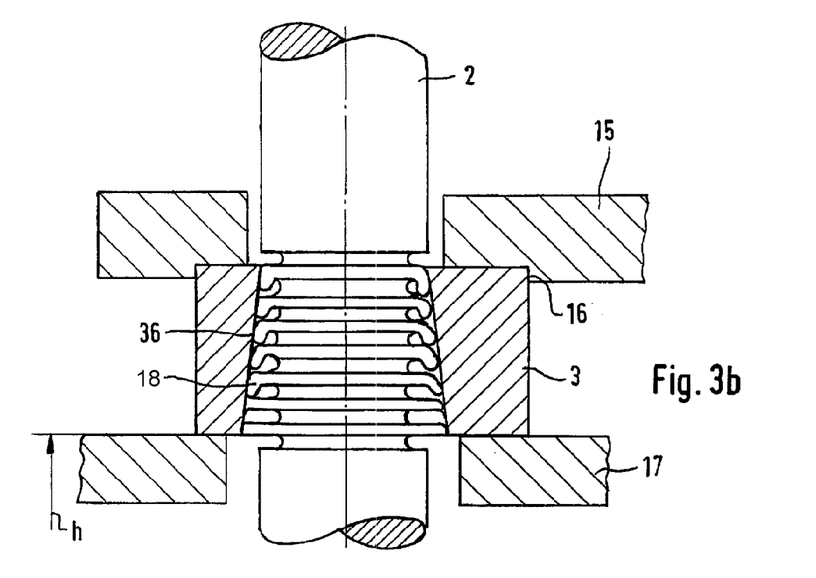

FIGS. 3a and 3b show an enlarged view of the shaft 2 and the cam 3 before or after pressing-on. In the exemplary embodiments in FIGS. 3a to 3b the height h up to which a cam 3 is to be pressed on is predefined by a pre-adjusted stop 17. In addition to the height h, the correct angular position is also important for the correct positioning of the cam 3 on the shaft 2. For this purpose, the shaft 2 (with the positioning element 7) is already positioned on the press-on station 5 such that the shaft 2 lies in the correct angular position, for example, by pre-adjusting the workpiece-receiving socket 6 of the press-on station 5. Alternatively, the cam 3 itself can also be brought into the correct angular position. The cam 3 is then pressed onto the shaft 2 in a predetermined position in the z direction by means of a guide 15 which holds the cam firmly and ensures that the cam 3 retains its angular position during the pressing-on process in the Z direction.

In the present exemplary embodiment the guide 15 has a seat 16 which is embodied as a tight fit to the cam 3. The cam opening 36 is constructed as substantially conical.

Figure 4:
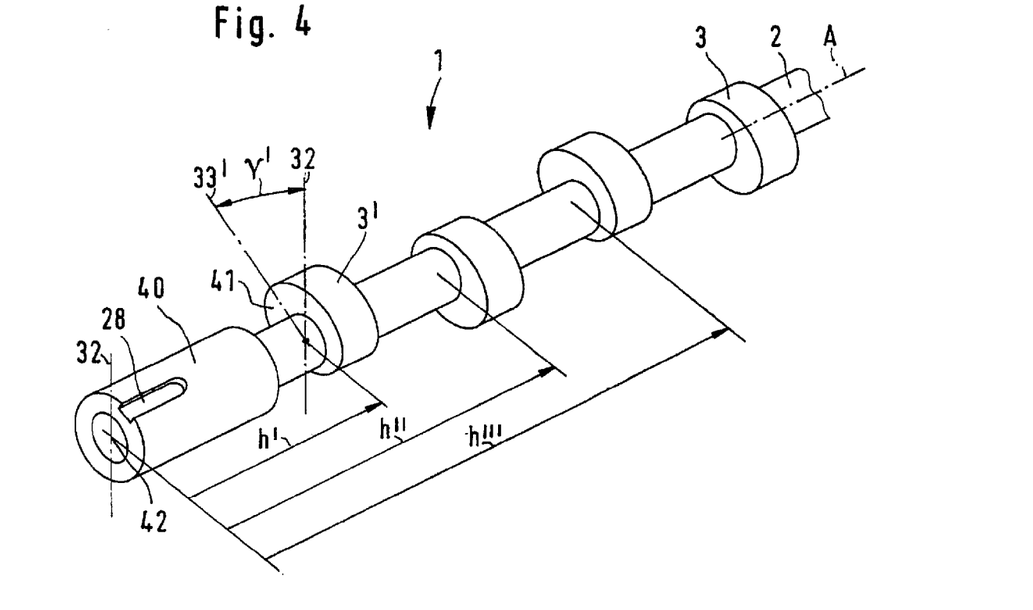

FIG. 4 shows a ready-assembled camshaft 1 consisting of a shaft 2 as the base body and cams 3 placed thereon. In the present exemplary embodiment the camshaft 1 has a groove 28 in the area of the shaft end which serves as a position reference. The longitudinal groove 28 constructed in the direction of the A axis is located on a shaft section 40 whose diameter is larger than that of the shaft base body 2. For relatively thick-walled tubular or solid shafts 2 it is naturally also possible to construct the groove 28 directly on the shaft base body 2. In addition to its function as a position reference, the groove 28 also serves the purpose that the camshaft can installed in a correct angular position in an internal combustion engine so that the position of the crankshaft of the internal combustion engine and the position of the camshaft are determined with respect to one another. Instead of a groove 28 other elements can also be envisaged as position references, for example, instead of a recess such as a groove, an elevation in the form of a taper key, a tooth-shaped profile or a hole are also possible.

As can be seen from FIG. 4, the position of a cam 3 is defined by a height h and an angle y. This will be illustrated for the example of the location or position of the first cam 3 of the camshaft 1: the pre-defined height h' is predetermined by the shaft end 42 and the front face 41 of the first cam 3. The height h' predefines the knurling area and the pressing-on path. The angular position y' of the first cam is formed by a fixed reference in relation to the shaft 2, such as a reference line 32 in the present case which goes through the position reference 28 and the axis of symmetry 33' of the symmetrically constructed cam 3.

Figure 5A:
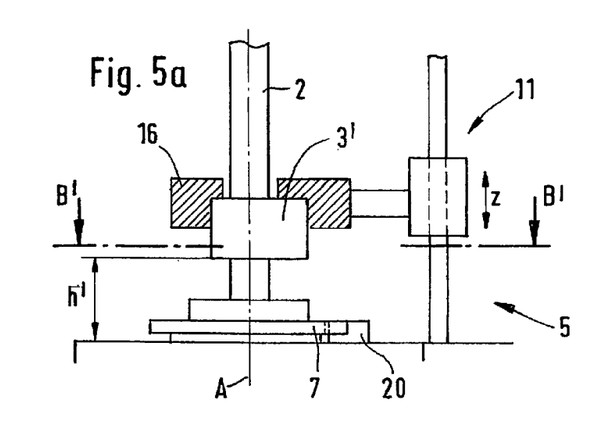
FIG. 5a is a side view of a press-on station at the instant of pressing a first cam onto a shaft.
Figure 5B:
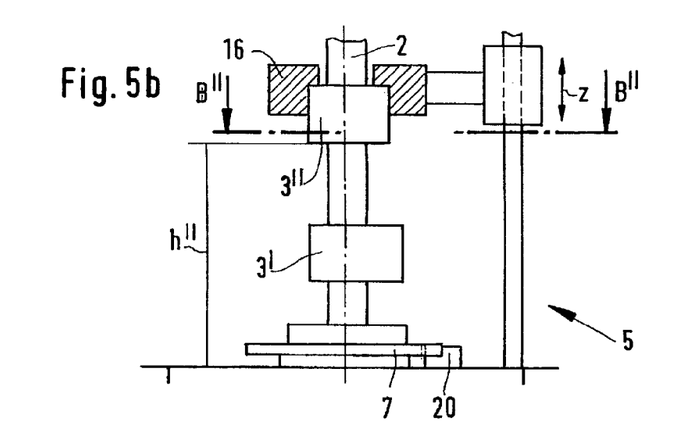
FIG. 5b is a side view of a press-on station according to FIG. 5a at the instant of pressing a second cam onto a shaft.
Figure 6A:
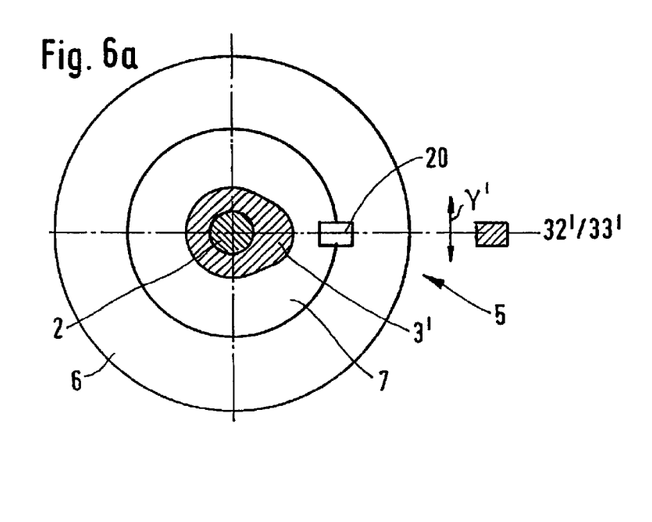
FIG. 6a shows the section B'-B' through a press-on station comprising a shaft and a first cam according to FIG. 5a, FIG. 6b shows the section B"-B" through a press-on station comprising a shaft and two cams according to FIG. 5b, FIGS. 7a, 7b, 8a, 8b are diagrams of a press-on station with shaft by analogy with FIG. 5a to 6b according to an alternative embodiment.
Figure 6B:
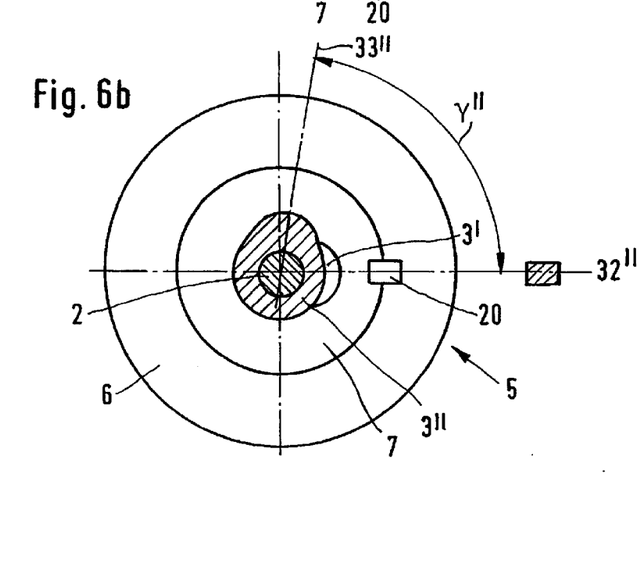

FIGS. 5a and 5b show a shaft 2 with a positioning element 7 affixed thereon, which has been brought into a press-on station 5. In FIG. 5a a first cam 3' is pressed on and in FIG. 5b a second cam 3" is pressed on. In this case, the position of the two cams differs in respect of the height h' or h" or in the respective angular position y' or y" as can be deduced clearly from the diagrams of the sections B'-B' or B"-B". For simplicity, the angle y' for the positioning of the first cam 3' according to FIG. 6a is zero. Naturally a different initial position can also be selected. In the present example, the angle y is formed between the diameter line 32 through the taper key 20, which runs between the positioning element 7 and a corresponding workpiece-receiving socket 6, and by the line through the first cam 3'. The angular position y' is thus already adjusted before insertion of the shaft 2 with the positioning element 7 connected thereto. In FIGS. 5b and 6b a second cam 3" is pressed onto the shaft 2. As shown in FIG. 6b, the defined position for fixing the shaft 2 is the same as in FIG. 6a. The press-on station 5 according to FIGS. 5b and 6b can be the same as in FIG. 5a and 6a or it can be a different press-on station 5. The position of the workpiece-receiving socket 6 is fixed for the workpiece-receiving sockets 6 of the press-on station 5, the taper key 20 or the line 32 are always at the same position. The correct angular position y2' for the second cam 3" is accomplished by a corresponding adjustment of the mounting seat 16.

Figure 7A:
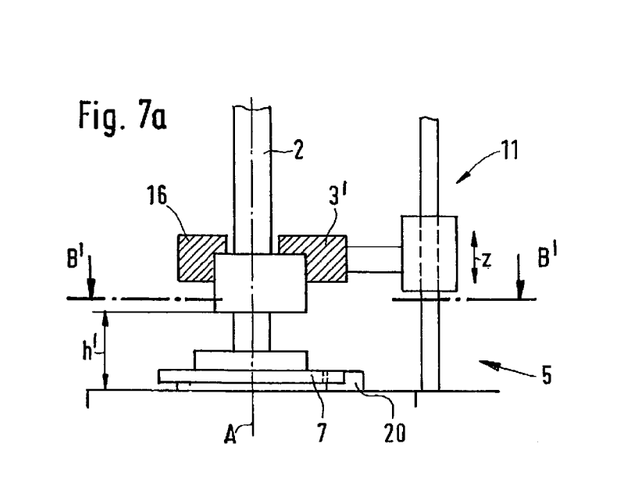
Figure 7B:
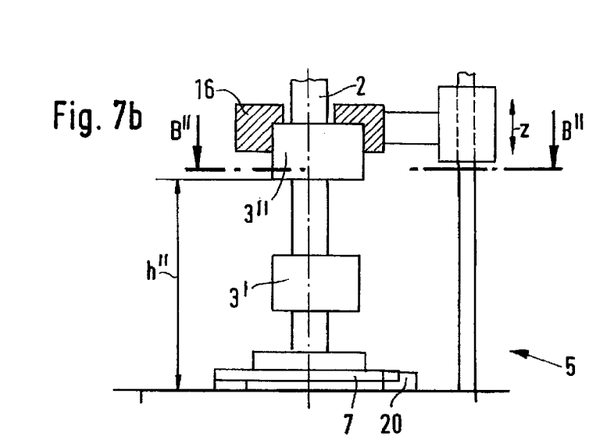
Figure 8A:
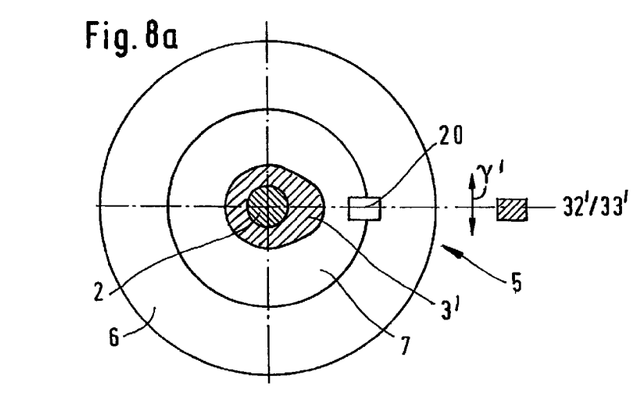
Figure 8B:
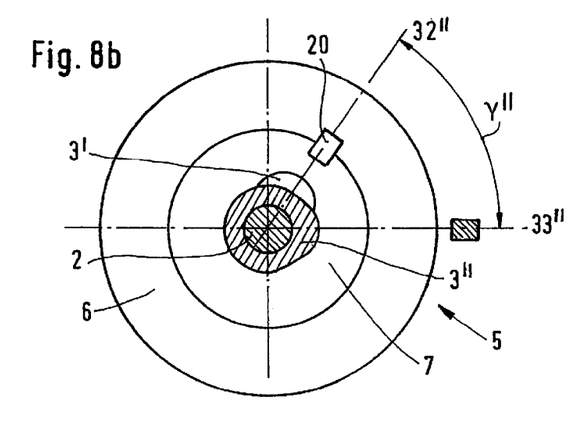

FIGS. 5a to 6b show an alternative method for creating the correct angular position of a cam 3, wherein FIGS. 7b and 8b only differ in principle from the preceding ones. FIG. 8b shows that before the second press-on process a workpiece-receiving socket 6 is turned so far and then fixed such that the angle y2' corresponds to the predetermined angle. The cam 3" is then pressed onto the shaft 2 from a position fixed for all press-on processes. The fixed position can be ensured, for example, by the mounting seat 16 having the same position for all press-on stations. Thus, the line 33" through the cam 3" clearly coincides with the line 33' according to FIG. 8a.

Figure 9:
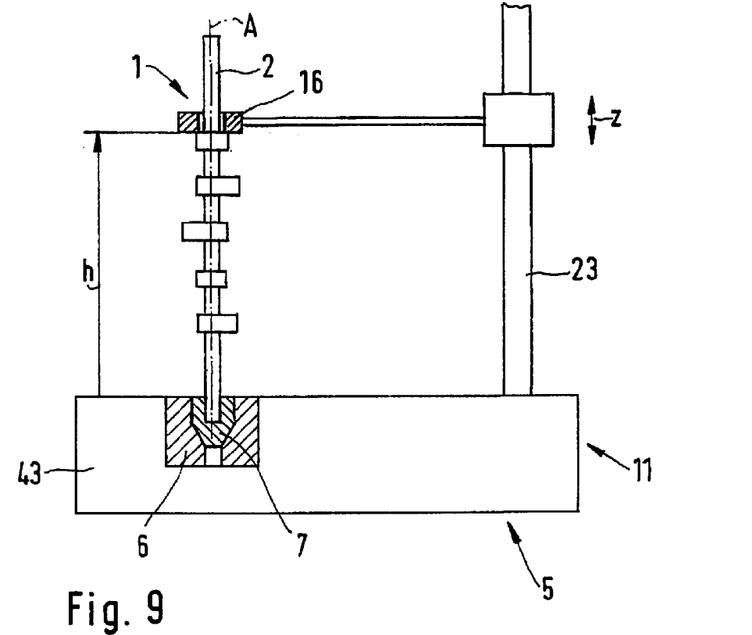
FIG. 9 is a schematic diagram of a side view of a shaft or camshaft and a press-on station.

FIG. 9 shows a camshaft 1 with a positioning element 7 affixed thereon which is brought into a press-on station 5. Thanks to the positioning element 7 or the workpiece-receiving socket 6 corresponding thereto, merely the mounting seat 16 for the respective cam 3 needs to be displaced in the z-direction for the height adjustment. Since the workpiece-receiving sockets 6 of the knurling stations 4 correspond to those of the press-on stations 5, the positioning of the rollers can be accomplished simply for the knurling process. Since the positioning element 7 remains on the shaft 2 over the entire machining process, the respective workpiece-receiving sockets in the machining stations 11, a knurling station 4 and a press-on station 5, are constructed as the same. This also applies if a plurality of knurling and press-on stations are provided.

Figure 10:
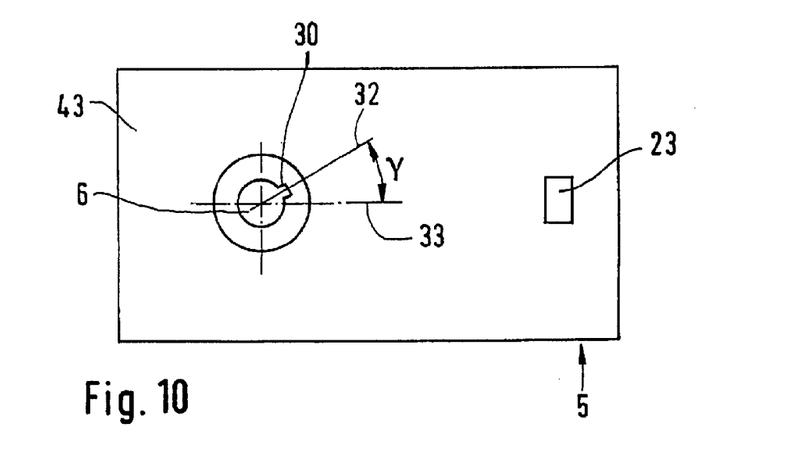
FIG. 10 is a plan view of the knurling station from FIG. 7.

FIG. 10 shows a plan view of a workpiece-receiving socket 6 and guide 23 for height adjustment in a machining station 11. In this case, as can be seen, the angular position y for pressing on a cam is formed by the axis of symmetry 33 and by the line 32. A knurling station 4 substantially only differs from a press-on station 5 with regard to its substructure in that the workpiece-receiving socket 6 can be rotated by means of a motor M, preferably a controlled electric motor. In contrast, the workpiece-receiving socket 6 of the press-on station 5 is fixedly connected to the substructure 43 of the machining station at least during the press-on process.

Figure 11:
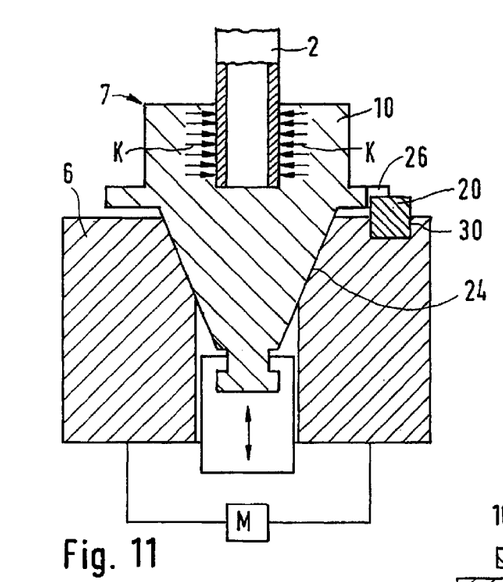
FIG. 11 is a side view with a partial section of the shaft with fixing element affixed thereto and parts of the machining station.

As can be seen from FIG. 11, the positioning element 7 can be embodied as a chuck 10. The chuck 10 has a conical guide-in area 24. With this geometry the chuck can be inserted quickly and in a tightly fitting manner into the corresponding workpiece-receiving socket 6. Consequently the chuck is non-positively connected to the workpiece-receiving socket 6. In addition, a positive connection can be achieved with a taper key 20 which can be inserted as an exact fit into the groove 26 of the chuck and the groove 30 of the workpiece-receiving socket. This taper key 20 is used on the one hand in the knurling station 4 to transmit the rotary movement from the motor M via the workpiece-receiving socket 6 to the shaft 2 and on the other hand for specifying the angular position of the respective cam 3 i relation to the press-on station. The chuck 10 can be fixed onto the shaft, wherein a clamping force K acts on the shaft 2 so as to produce a firm connection.

Figure 12:
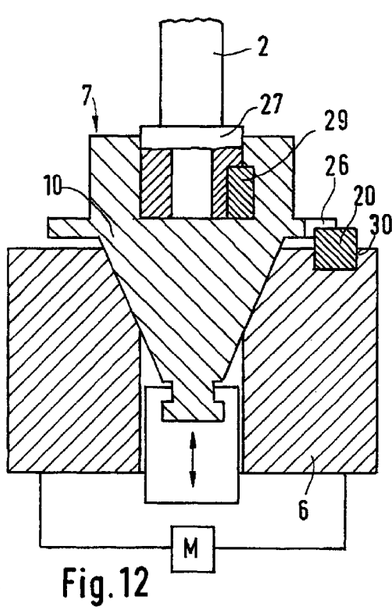
FIG. 12 is a side view with a partial section of the shaft with positioning element affixed thereto and parts of the machining station according to a further exemplary embodiment.

FIG. 12 shows another exemplary embodiment of a chuck 10, wherein the chuck jaw-shaft or chuck jaw-shaft expansion (27) connection has an additional position reference in the form of a taper key 29. The chuck jaw 10 for its part is clamped in a corresponding workpiece-receiving socket 6.

Figure 13:
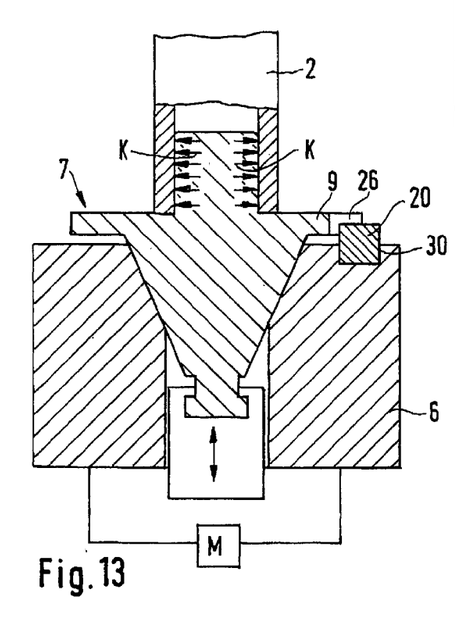
FIG. 13 is a side view with a partial cross-section of the shaft with a mandrel affixed thereon.

A further exemplary embodiment of a positioning element 7 is shown in FIG. 13 where the positioning element 7 is embodied as a mandrel 9. The mandrel 9 is constructed as conical for simpler handling and insertion into the relevant workpiece-receiving socket 6 so that it fits tightly. The mandrel 9 allows a space-saving connection to a tubular base body 2. In this case, the shaft-side part of the mandrel 9 is inserted into the tube end of the shaft 2 and expanded so as to produce a clamping force K for a firm connection between the shaft 2 and mandrel 9.

Figure 14:
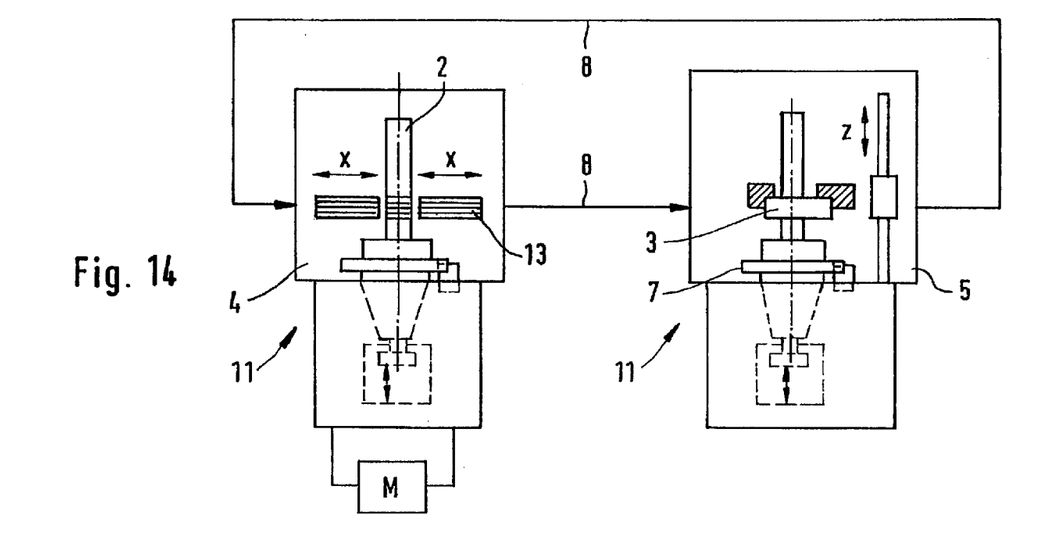
FIG. 14 is a schematic plan view of an arrangement for producing a camshaft comprising a machining module, substantially comprising a knurling and a press-on station

FIG. 14 shows an arrangement of machining stations 11 which has only one knurling station 4 and one press-on station 5. In this arrangement, the shaft 2 is knurled at the provided position in the knurling station 4 and then the first cam 3 is pressed-on in the desired position in the press-on station 5. The respective machining stations are pre-adjusted for this purpose. The rollers 13 of the knurling station 4 were fixed mechanically approximately at a height h so that the rollers can only move in the x-direction. In addition to the correct height position, the workpiece-receiving socket 6 must be adjusted to the correct angular position and fixed in the press-on station 5. In this way, a plurality of cams 3 can be pressed onto a plurality of shafts 2 with reference to one cam position. After all the shafts 2 to be machined (with the relevant positioning elements 7) have passed through the machining arrangement, the respective machining positions 11, 11', i.e. the knurling station 4 and the press-on station 5 are re-adjusted for a second position for a second cam 3". This is repeated until the last cam 3 has been pressed onto the shaft 2. Then, if a positioning element 7 has been used, the positioning element 7 can be removed from the shaft 2 or camshaft 1. The shaft with the respective positioning element 7 can be conveyed from one machining station 11 to another either manually or by means of a manipulating device. By using merely one machining station in each case, smaller series can be produced cost-effectively.

The investment costs are drastically reduced.

The respective machining stations 11 in principle also always have a workpiece-receiving socket 6 which is the same shape. This makes it possible to increase the positioning accuracy.

It is furthermore also possible to manage with few positioning elements 7. In extreme cases, merely one positioning element 7 which is advantageously embodied as a chuck 10 or a mandrel 9 is sufficient.

Figure 15:
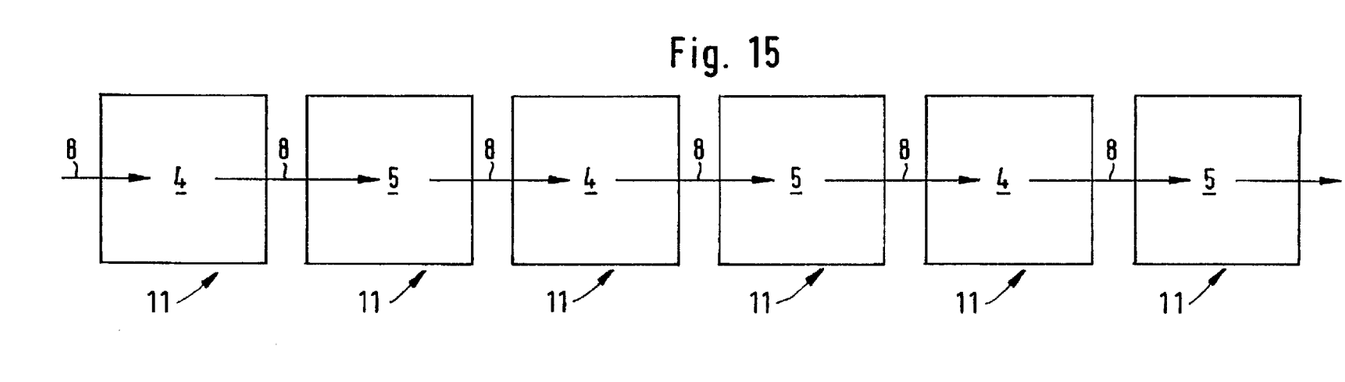
FIG. 15 is a schematic plan view of an arrangement for producing a camshaft comprising a plurality of knurling and press-on stations.

The exemplary embodiment according to FIG. 15 shows an arrangement with machining stations 11 which is suitable for large numbers of camshafts 1. An arrangement which has precisely as many machining stations as the number of cams 3 which need to be pressed on the shaft 2 is particularly advantageous in this case. The respective machining stations are pre-adjusted before the beginning of a series, as has already been described in detail. This arrangement now allows high numbers of camshafts 1 to be produced cost-effectively and allows an efficient and very high production speed for the manufacture of a camshaft 1. Since substantially only mechanically fixedly-adjusted machining stations 11 are used, a complex control device is superfluous. Since the respective positions of the machining stations can be adjusted mechanically, rapidly and simply, the machining line can also be managed by machine operators having a relatively low degree of training, especially no programming or CNC knowledge. Respectively two machining stations, a knurling station 4 and a press-on station 5, each relating to the same cam, can be considered to be a module. If, for example, one press-on station 5 fails as a result of a technical defect, preferably the entire module is changed. Consequently, major production failures can be quickly and simply eliminated. It is therefore advantageous to have one module as a reserve unit for large numbers of items.

However, it is also conceivable to use mixed forms of the aforesaid arrangements. In the case of a moderate number of items, it can be advantageous to use merely respectively 4 machining stations, that is only four knurling stations 4 and four press-on stations 5, instead of eight knurling stations 4 and press-on stations 5 for assembly of a camshaft 1, so that the shaft 2 must run twice through said arrangement. After the shaft has passed through the first four machining stations, these are re-adjusted for the following four cam positions which is easy to accomplish thanks to the small number of adjustment parameters (h, y).

It is especially advantageous if the workpieces, that is the shaft with the positioning element 7 affixed thereon and the cams 3 already pressed thereon are conveyed from one machining station to the next in a clocked manner by means of the manipulating device 8. This has the result that the machining line can operate without stoppage times. The manipulating devices 8 thus ensure that all the workpieces located in the workpiece-receiving sockets 6 of the machining station 11 are conveyed further at the same time. It is also feasible that during the conveyance of the camshaft 1 from one machining station 11 to the next, a cleaning process is provided at the same time, for example, using compressed air or using a cleaning liquid so as to ensure a high machining quality of the camshaft 1.

The invention claimed is:

1. A camshaft producing system for manufacturing a camshaft from a shaft and at least one cam, said camshaft producing system comprising:
    a positioning element removably affixed to said shaft;
    a manipulating device for transporting said shaft, said manipulating device adapted to be attachable to said positioning element; and
    at least two machining stations comprising:
        at least one knurling station having a corresponding first workpiece-receiving socket for receiving said shaft using said positioning element affixed thereon, said knurling station being adapted to rotate said shaft; and
        at least one press-on station having a corresponding second workpiece-receiving socket for receiving said shaft using said positioning element affixed thereon, said press-on station being adapted to press said cam on to said shaft.

2. The camshaft producing system as set forth in claim 1, wherein said knurling station further comprising a motor for rotating said shaft.

3. The camshaft producing system as set forth in claim 2, wherein said positioning element further comprising a conical guide-in area adapted to tightly fit into said corresponding workpiece-receiving socket of said knurling and press-on stations.

4. The camshaft producing system as set forth in claim 2 further comprising a taper key insertable into a groove defined in said positioning element and a groove defined in said workpiece-receiving socket, wherein said taper key is used in said knurling station to transmit the rotary movement from said motor via said workpiece-receiving socket to said shaft and for specifying the angular position of said respective cam in relation to said press-on station.

5. The camshaft producing system as set forth in clam 3, wherein said positioning element further comprising a jaw-shaft expansion and a taper key, wherein said taper key is insertable into said jaw-shaft expansion and said positioning element.

6. The camshaft producing system as set forth in claim 3, wherein said positioning element is selected from the group consisting of a mandrel, and a chuck.

7. The camshaft producing system as set forth in claim 3, wherein said knurling station further comprising rollers which can be displaced in the x-direction and in the z-direction, said rollers being adapted to be moved by means of a guide into the correct height position for knurling.

8. The camshaft producing system as set forth in claim 7, wherein said rollers having a plurality of adjacent grooves adapted to form, over the circumference of said shaft, indentations and material accumulations on said shaft when said rollers are pressed in towards said shaft.

9. The camshaft producing system as set forth in claim 8, wherein said press-on station further comprising a guide and an adjustable stop, wherein said guide having a seat adapted to hold said cam while retaining its angular position during the pressing-on process in the Z direction, wherein said adjustable stop being adapted to define the height up to which said cam is to be pressed on to said shaft.

10. A camshaft producing system comprising:
    a shaft having a base body, a groove in the area of the shaft end which serves as a position reference;
    at least one cam having a centrally defined opening;
    a positioning element removably affixed to said shaft;
    a manipulating device for transporting said shaft, said manipulating device adapted to be attachable to said positioning element; and
    at least two machining stations comprising:
        at least one knurling station having a corresponding first workpiece-receiving socket for receiving said shaft using said positioning element affixed thereon, a motor adapted to rotate said shaft, and at least one roller, said rollers being displaceable in the x-direction and in the z-direction by means of a guide;
        at least one press-on station having a corresponding second workpiece-receiving socket for receiving said shaft using said positioning element affixed thereon, said press-on station being adapted to press said cam on to said shaft;
    wherein said roller having a plurality of adjacent grooves adapted to form, over the circumference of said shaft, indentations and material accumulations on said shaft when said roller is pressed in towards said shaft;
    wherein said positioning element having a conical guide-in area adapted to tightly fit into said corresponding workpiece-receiving socket of said knurling and press-on stations.

11. The camshaft producing system as set forth in claim 10 further comprising a taper key insertable into a groove defined in said positioning element and a groove defined in said workpiece-receiving socket, wherein said taper key is used in said knurling station to transmit the rotary movement from said motor via said workpiece-receiving socket to said shaft and for specifying the angular position of said respective cam in relation to said press-on station.

12. The camshaft producing system as set forth in claim 11, wherein said press-on station further comprising a guide and an adjustable stop, wherein said guide having a seat adapted to hold said cam while retaining its angular position during the pressing-on process in the Z direction, wherein said adjustable stop being adapted to define the height up to which said cam is to be pressed on to said shaft.

13. A method of producing a camshaft from a shaft and at least one cam, said method comprising the steps of:
    providing a camshaft producing system comprising: a positioning element removably affixed to a shaft; a manipulating device for transporting said shaft, said manipulating device adapted to be attachable to said positioning element; and at least two machining stations comprising: at least one knurling station having a corresponding first workpiece-receiving socket for receiving said shad using said positioning element affixed thereon, said knurling station being adapted to rotate said shaft; and at least one press-on station having a corresponding second workpiece-receiving socket for receiving said shaft using said positioning element affixed thereon, said press-on station being adapted to press said cam on to said shaft;
    affixing said positioning element to the end of said shaft;
    transporting said positioning element and shaft to said knurling station via said manipulating device;
    affixing said positioning element and shaft to said knurling station for the duration of a first machining step;
    transporting said positioning element and shaft from said knurling station to said press-en station via said manipulating device after said first machining step is complete; and
    affixing said positioning element and shaft to said press-on station for the duration of second machining step.

14. The method of producing a camshaft as set forth in claim 13, wherein said shaft is knurled in said first machining step.

15. The method of producing a camshaft as set forth in claim 14, wherein a cam is pressed onto said shaft in said second machining step.

16. The method of producing a camshaft as set forth in claim 15, wherein said shaft is knurled on said knurling station in the area of the position provided for said cam, then in a second step said cam is pressed on said press-on station in said provided position and said two steps are then repeated for further cams.

17. The method of producing a camshaft as set forth in claim 16 further comprising the step of removing said positioning element from said shaft after the last pressing-on of said cam in said press-on station.

18. The method of producing a camshaft as set forth in claim 17, wherein multiple knurling steps are carried out in respectively the same knurling station, and multiple pressing steps are carried out in respectively the same press-on station.

19. The method of producing a camshaft as set forth in claim 17, wherein multiple knurling steps are carried out in a plurality of respectively the same knurling station, and multiple pressing steps are carried out in a plurality of respectively the same press-on station.

20. The method of producing a camshaft as set forth in claim 17, wherein said shaft is fixed using said positioning element first in said workpiece-receiving sockets of said knurling and press-on stations.

21. The method of producing a camshaft as set forth in claim 17, wherein in the defined position for fixing said shaft onto said press-on station using said positioning element pre-defines the angular position for pressing-on said cam.

* * * * *